(12) United States Patent
Mucsi et al.

(10) Patent No.: US 11,541,526 B2
(45) Date of Patent: Jan. 3, 2023

(54) HAND-HELD POWER TOOL HAVING AN ELECTRONICALLY COMMUTATED MOTOR

(71) Applicant: Robert Bosch GmbH, Stuttgart (DE)

(72) Inventors: Gyoergy Mucsi, Ditzingen (DE); Yavuz Guerlek, Hechingen (DE)

(73) Assignee: Robert Bosch GmbH, Stuttgart (DE)

( * ) Notice: Subject to any disclaimer, the term of this patent is extended or adjusted under 35 U.S.C. 154(b) by 293 days.

(21) Appl. No.: 16/919,830

(22) Filed: Jul. 2, 2020

(65) Prior Publication Data

US 2021/0001464 A1   Jan. 7, 2021

(30) Foreign Application Priority Data

Jul. 4, 2019 (DE) .................... 10 2019 209 851.7

(51) Int. Cl.
| | |
|---|---|
| *B25F 5/00* | (2006.01) |
| *H02K 7/14* | (2006.01) |
| *H02K 11/33* | (2016.01) |
| *H02P 6/14* | (2016.01) |
| *B24B 23/02* | (2006.01) |

(52) U.S. Cl.
CPC ............ *B25F 5/001* (2013.01); *B24B 23/028* (2013.01); *H02K 7/145* (2013.01); *H02K 11/33* (2016.01); *H02P 6/14* (2013.01)

(58) Field of Classification Search
CPC ....... B25F 5/001; B24B 23/028; H02K 11/33; H02K 7/145; H02P 6/14
See application file for complete search history.

(56) References Cited

U.S. PATENT DOCUMENTS

| | | | | |
|---|---|---|---|---|
| 5,457,366 | A * | 10/1995 | Wehberg .................. | H02P 6/08 318/400.25 |
| 7,030,583 | B2 * | 4/2006 | Lelkes .................... | H02P 25/03 318/434 |
| 10,742,143 | B2 * | 8/2020 | Roemmelmayer ....... | H02P 6/18 |
| 2005/0007051 | A1 * | 1/2005 | Lelkes ...................... | H02P 6/15 318/400.09 |
| 2017/0106520 | A1 * | 4/2017 | Schadow .................. | B25F 3/00 |
| 2017/0113319 | A1 * | 4/2017 | Boeck ....................... | B25F 5/00 |

FOREIGN PATENT DOCUMENTS

| | | |
|---|---|---|
| DE | 41 00 864 A1 | 7/1992 |
| DE | 103 46 711 A1 | 5/2005 |
| DE | 10 2016 206 050 A1 | 10/2017 |

* cited by examiner

*Primary Examiner* — Andrew M Tecco
*Assistant Examiner* — Nicholas E Igbokwe
(74) *Attorney, Agent, or Firm* — Maginot, Moore & Beck LLP (57) ABSTRACT

A hand-held power tool includes an electronically commutated motor including a motor winding. Motor electronics of the hand-held power tool are configured to electronically commutate the motor winding using a selected one of a plurality of electrical precontrol angles, thereby adapting the motor winding to different mechanical load conditions of the electronically commutated motor.

13 Claims, 7 Drawing Sheets

HAND-HELD POWER TOOL HAVING AN ELECTRONICALLY COMMUTATED MOTOR

This application claims priority under 35 U.S.C. § 119 to application no. DE 10 2019 209 851.7, filed on Jul. 4, 2019 in Germany, the disclosure of which is incorporated herein by reference in its entirety.

The present disclosure relates to a hand-held power tool having an electronically commutated motor, which has a motor winding, and having motor electronics for electronic commutation of the motor winding.

BACKGROUND

Electronically commutated electric motors are widely used in mains-operated or mains-independent hand-held power tools due, inter alia, to their low maintenance and comparatively good controllability. Such electric motors usually require complex power electronics for control. Within the power electronics, a precontrol angle of the commutation is usually stored for at least every operationally relevant operating point of the motor, or the precontrol angle can be changed adaptively, by means of intelligent software, without any user intervention. The user cannot influence the precontrol angle, such that it is not possible to adapt it to a suitable operating point of the motor.

In many applications, the maximum possible mechanical power of the motor cannot be obtained. Even by adaptive precontrol angle adjustment, controlled operation in the range of the natural characteristic curve of the motor is not achievable. Since the true effective value of the current $I_{rms}$ (=root mean square) in the motor winding increases proportionally as the mechanical load on the motor increases, optimal operation of the motor is not ensured until the rotational speed drops for the first time as the load increases further. An unfavorable heat development, or high current peaks within the motor winding in the controlled rotational speed range, are the result. This results in an increased thermal cycling of the motor, such that the insulation system of the motor winding ages faster, which can lead to failure of the whole motor. In addition, the increased effective value of the current $I_{rms}$ in the motor winding in the case of a non-optimal precontrol angle results in a reduced efficiency of the electronically commutated motor.

DE 103 46 711 A1 relates to a method for commutation of a brushless direct-current motor having at least one motor winding. In the case of the direct-current motor, the position of the rotor in relation to the stator is determined and a commutation signal is generated therefrom, the motor winding being simultaneously supplied with current at a preset commutation angle in dependence on the commutation signal. Depending on the design and the current supply to the motor, it is provided, inter alia, that the polarity of the winding current is sensed upon the occurrence of a commutation signal, and the commutation angle is altered in dependence on the sensed polarity of the winding current, in such a manner that the winding current is substantially zero, or passes through zero, upon the occurrence of a commutation signal. The already known method for commutation of a brushless direct-current motor enables an automatic improvement of the commutation angle, or of the so-called precontrol angle, by the electronic motor control with a small amount of additional technical complexity and minimal additional costs.

SUMMARY

The present disclosure relates to a hand-held power tool having an electronically commutated motor, which has a motor winding, and having motor electronics for electronic commutation of the motor winding. An electrical precontrol angle, which can be preset by the motor electronics for electronic commutation of the motor winding, can be adjusted for adaptation to differing mechanical load conditions of the electronically commutated motor. The electrical precontrol angle can preferably be adjusted by a user of the hand-held power tool.

As a result, inter alia, the efficiency of the electronically commutated motor can be improved. The thermal cycling load on the motor winding in the case of high mechanical loading decreases, such that the service life of the motor increases and, in the case of battery-operated hand-held power tools, battery life is extended. The disclosure is primarily intended for hand-held power tools for which extreme overloads can occur during operation, such as, for example, hammer drills, angle grinders, orbital sanders and circular saws.

According to an advantageous development, the precontrol angle can be adjusted in at least two stages by a user, in a manual mode, by means of at least one operator control element, and the at least two stages are each provided with a marking, which together with the operator control element form an operator control panel. Preferably, the precontrol angle can be set in three stages by a user, in a manual mode, by means of at least one operator control element. As a result, the user has full and intuitive control over the performance of the hand tool. The at least two, preferably three, markings may be identified, for example, with the Arabic numerals "1", "2" and "3" for each load condition typically occurring during operation of the hand tool. The mechanical torque that can be obtained by the electronically commutated motor increases with each stage.

Preferably, a first stage is assigned to a light load condition, a second stage to a medium load condition and a third stage to a heavy load condition of the electronically commutated motor. This ensures that the precontrol angle can be adjusted to a sufficiently fine degree in practical use of the hand-held power tool. In the case of a hand-held power tool realized exemplarily as an orbital sander, the light load condition occurs, for example, in the form of fine sanding during light woodworking, the medium load condition is caused by rough woodworking and the heavy load condition is caused by polishing work with a high contact pressure.

Preferably, a precontrol angle of −30° is assigned to the first stage, a precontrol angle of −60° is assigned to the second state, and a precontrol angle of −90° is assigned to the third stage. As a result, the hand-held power tool can be operated in a suitable manner, depending on the particular currently prevailing load condition.

In the case of a technically advantageous design, a precontrol-angle control unit is provided, which is designed to determine the precontrol angle in dependence on at least two load conditions of the electronically commutated electric motor, in particular in the form of a light, a medium and/or a heavy load condition, in a semi-automatic mode or a fully automatic mode. As a result, simplified setting of the precontrol-angle control unit is possible. In the semi-automatic mode, the user needs only to set the precontrol angle, preset by the precontrol-angle control unit, by means of the control element, whereas in the fully automatic mode no further user action is required at all.

According to a further advantageous design, a display unit is provided, as part of an operator control panel, which is designed to visualize the precontrol angle determined by the precontrol-angle control unit in dependence on the present load condition and to be set manually by a user by means of an operator control element in the semi-automatic mode. This provides the user with an aid to facilitate correct setting of the precontrol-angle control unit.

Preferably, for each of the at least two load conditions, the display unit has at least one display element, in particular at least two differently colored LEDs, that can be seen by the user. This provides the user with a clearly visible indication of the precontrol angle control unit to be selected for the respective load condition. For example, in the case of a hand-held power tool having a multi-stage mechanical variable-speed transmission, such as a power drill etc., a display for the present load status, or the torque to be applied by the electronically commutated motor, may be provided, which may, if necessary, be coupled with a switchover recommendation for the mechanical variable-speed transmission.

According to a technically advantageous development, the precontrol-angle control unit is designed to measure at least one rotational speed and/or one torque of the electronically commutated motor, and/or one current of the motor winding of the electronically commutated motor. The appropriate precontrol angle control unit for the respective present load condition of the electronically commutated motor can be determined on the basis of these measured values.

Preferably, a parameter table for determining the precontrol angle is stored in the precontrol-angle control unit, it being possible to determine, with the aid of the parameter table and at least the measured present rotational speed and/or the present torque of the electronically commutated motor, and/or the present current of the motor winding of the electronically commutated motor, a respective precontrol angle to be applied. For this purpose, the empirical data necessary for selection of the suitable precontrol angle, or the characteristics for all operationally relevant load conditions of the specific electronically commutated motor installed in the hand-held power tool, are stored in the parameter table.

Preferably, in the fully automatic mode, setting of the precontrol angle is effected by means of the motor electronics controlled accordingly by the precontrol-angle control unit. As a result, the hand-held power tool is convenient to operate, and operating errors by the user or operator can be largely precluded.

According to a technically advantageous development, the fully automatic mode can be switched over by the user into the semi-automatic mode or the manual mode by means of at least one further operator control element. It is thereby possible, if necessary, to switch between the semi-automatic and the fully automatic mode of the hand-held power tool.

In the case of an advantageous development, operationally relevant data of all load conditions occurring in practical operation of the electronically commutated electric motor, in particular the rotational speed, the torque, and at least the current of the motor winding and its temperature, can be transmitted, by means of the motor electronics and/or the precontrol-angle control unit, to an external server for evaluation. As a result, incorrect operation by the user can be detected and, in addition, the development of future generations of electronically commutated motors can be further improved, or advanced. For this purpose, any wireless and/or wired interfaces such as WLAN, Bluetooth®, LAN etc. may be assigned to the hand-held power tool. In the context of the present description, the term "external server" is used synonymously with the term "Cloud", which is particularly common in the English-speaking world.

BRIEF DESCRIPTION OF THE DRAWINGS

The disclosure is described in greater detail in the following description on the basis of the exemplary embodiments represented in the drawings. There are shown.

DETAILED DESCRIPTION

Figure 1:
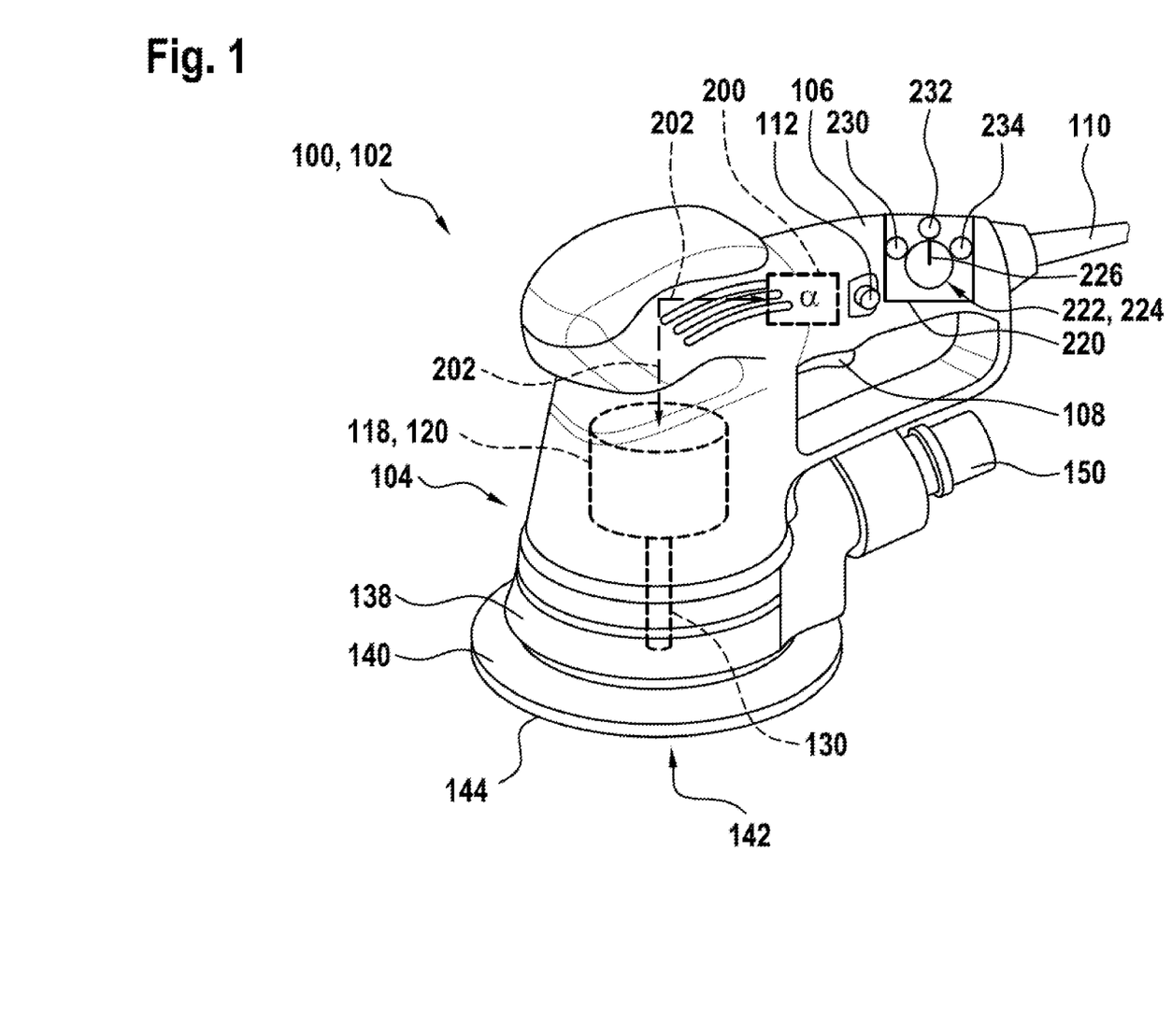
FIG. 1 a perspective view of a hand-held power tool having an electronically commutated motor, motor electronics, and having an operator control element of an operator control panel for setting a precontrol angle, FIG. 2 a schematic representation of the EC motor, with the motor electronics of FIG. 1 and a precontrol-angle control unit, FIG. 3 a rotational speed/torque characteristic of the EC motor of FIG. 2, FIG. 4 a torque/current characteristic of the EC motor of FIG. 2 in the case of a rotational speed of 9,000 and 10,000 revolutions per minute as a function of an electric precontrol angle, FIG. 5 a torque/current characteristic of the EC motor of FIG. 2 in the case of a rotational speed of 7,000 and 8,000 revolutions per minute as a function of an electric precontrol angle, FIG. 6 a torque/current characteristic of the EC motor of FIG. 2 in the case of a rotational speed of 5,000 and 6,000 revolutions per minute as a function of an electric precontrol angle, and FIG. 7 a parameter table assigned to the EC motor of FIG. 2.

FIG. 1 shows an exemplary mains-operated hand-held power tool 100, which here is realized, purely by way of example, as an orbital sander 102. The hand-held power tool 100 has a power-tool housing 104, arranged in which there is an electric drive motor 118, the drive motor 118 being realized as an electronically commutated motor 120. Other than the hand-held power tool 100 that in this case is realized, purely by way of example as an orbital sander 102, the hand-held power tool may also be realized as a hammer drill, angle grinder or circular saw. The power-tool housing 104 has a handle 106 that comprises a mains power switch 108, and has a mains power line 110 for connection to the local alternating current mains power supply system. It should be noted at this point that the disclosure is not limited to mains-operated hand-held power tools, but is equally applicable to cordless battery-powered hand-held power tools. The electronically commutated motor 120, which in the further course of the description is referred to by the term "EC motor 120", drives a sanding pad 140 eccentrically by means of an output shaft 130 accommodated in a base portion 138 of the power-tool housing 104. An abrasive means such as a sanding disc 144, e.g. made of fiber-reinforced paper etc., can be attached to an underside 142 of the sanding pad 140 that faces towards a workpiece, not shown.

Figure 2:
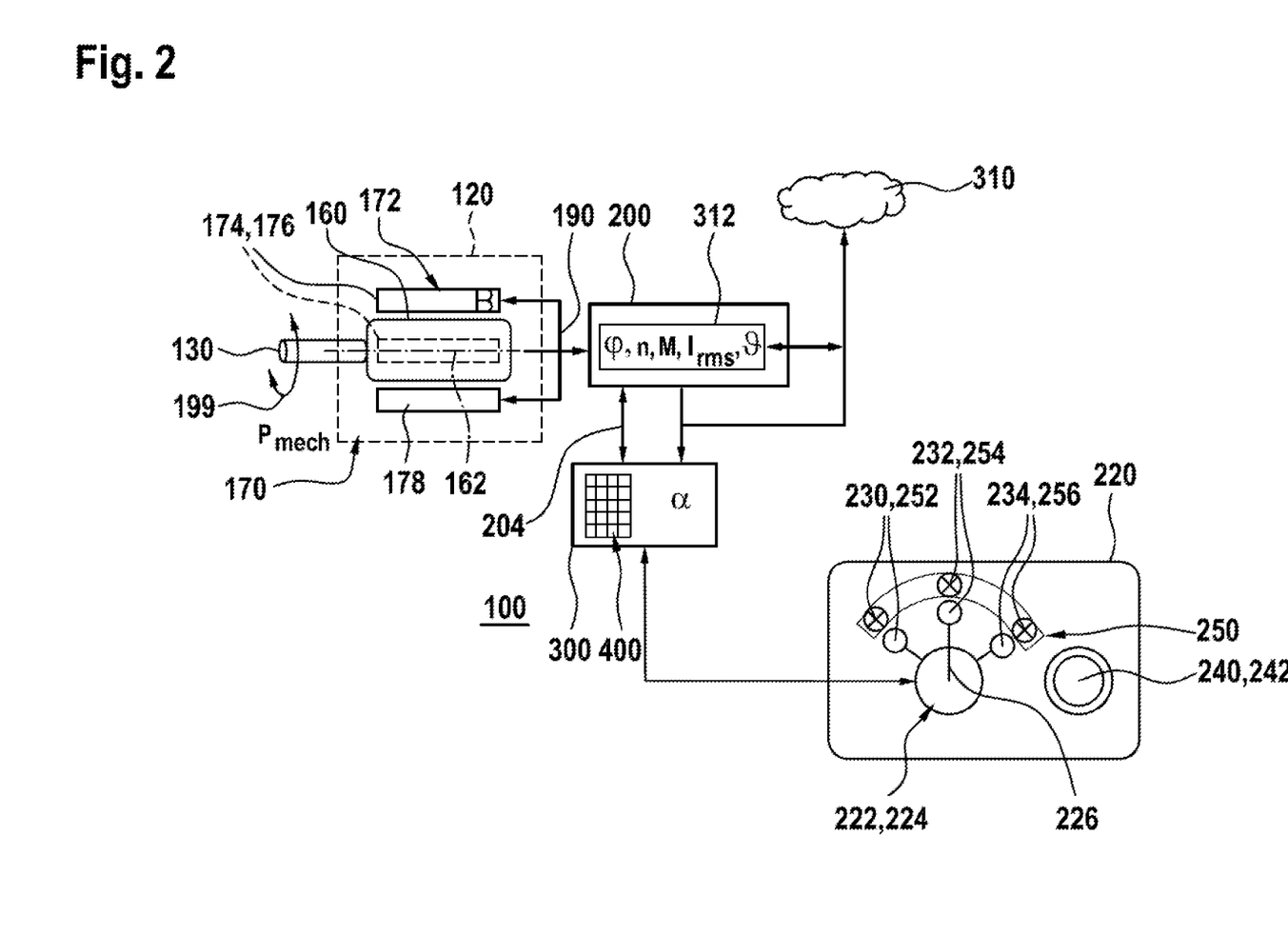

The EC motor 120 has a motor winding, not represented here, having preferably three phase windings (cf. FIG. 2, references 172, 174, 176, 178). An electrical precontrol angle $\alpha$ assigned to the hand-held power tool 100 is also referred to in the literature as an "advance angle". The electrical precontrol angle $\alpha$ defines when a voltage is applied to a particular phase winding of the EC motor 120 by an assigned set of motor electronics 200. For example, an intersection of EMF curves (electromotive force curves) of two successive motor phases may be regarded as a reference point. In the case of a precontrol angle $\alpha$ of less than 0°, the voltage is applied earlier. Thus, a precontrol angle $\alpha$ of −30° means that the voltage is applied, by the motor electronics 200, 30° before the point of intersection of the EMF curves of two phases of the EC motor 120. In the case of a positive precontrol angle α of greater than 0°, the voltage is applied with a corresponding time delay, or later.

In addition, integrated into the base portion 138 of the power-tool housing 104 there is a suction extraction device 150 for the dust that is generated when work is being performed on workpieces by means of the orbital sander 102. A standard household vacuum cleaner, for example, may be connected to the suction extraction device 150. By means of a locking element, preferably a button-type locking element 112 within the handle 106, the mains switch 108 can be permanently held in the switched-on position if necessary. Pressing down of the locking element 12 again enables it to be unlocked, in order to release the mains switch 108 again for the purpose of rapidly switching off the orbital sander 102. The EC motor 120 is controlled, by open-loop and/or closed-loop control, by the powerful digital motor electronics 200, as indicated by the broken-line double arrow 202.

Preferably, an operator control panel 220, having an operator control element 222, is integrated into the handle 106 of the power-tool housing 104, the operator control element 220 being realized here, purely by way of example, as a rotary switch 224, which has three stages. The rotary switch 224 is used to select a precontrol angle α of the EC motor 120, stored in the motor electronics 200, for the purpose of adaptation to differing load conditions of the hand-held power tool 100, or of the EC motor 120, by a user of the hand-held power tool 100 in a so-called manual mode. In this manual mode of the hand-held power tool 100 there are, for example, at least two, preferably three, stages that can be set by the user: light work, medium-heavy work and work with heavy load on the hand-held power tool 100. Each stage can be selected manually by the user, and there is assigned to each individual setting exactly one predetermined, or calculated, precontrol angle α, which guarantees a maximum power output of the EC motor 120 in the respective load condition, and thus improved work with the hand-held power tool without the risk of thermal overload or the like. At the same time, preferably, in the case of battery-operated hand-held power tools, the battery life is extended. In the context of the present disclosure, a user of the hand-held power tool 100 can set the precontrol angle α for adaptation to differing load conditions of the hand-held power tool 100, or of the EC motor 120.

Alternatively or optionally, the operator control panel 220 has at least two, illustratively and preferably a first, a second and a third marking 230, 232, 234, which are easily visible to the user and which each correspond to at least two, preferably three stages of the rotary switch 224. As illustrated here, the first marking 230, the second marking 232 and the third marking 234 may be provided, for example, with the three Arabic numerals "1", "2" and "3". In addition, the three markings 230, 232, 234 may have different colors for the purpose of better differentiation. Thus, for example, the first marking 230 may be colored green, the second marking 232 may be highlighted in yellow and the third marking 234 may be colored red. The first marking 230 represents a light mechanical load condition, the second marking 232 represents a medium mechanical load condition and the third marking 234 represents a heavy mechanical load condition of the hand tool 100, or of the EC motor. If the hand-held power 100 is, for example, an angle grinder, not shown, the light load condition occurs during a roughing process, the medium load condition during, for example, a cutting process, and the heavy load condition during large-area intensive material-removing work on a workpiece on which work is to be performed.

In the shown exemplary embodiment of FIG. 1, a line-type marking 226 of the rotary switch 224 points to the second marking 232, such that, on the part of the motor electronics 200, a precontrol angle α suitable for the middle load condition of the EC motor 120 is active. Accordingly, a precontrol angle α suitable for the light or heavy load condition can be set by turning of the rotary switch 224 by the user in that the rotary switch 224 is turned counterclockwise or clockwise until the marking 226 is directed towards the first or the third marking 230, 234. In this case, preferably, a precontrol angle α of up to −30° is assigned by the motor electronics 200 to the first stage, having the first marking 230. A precontrol angle α of preferably between −15 and −60° is assigned to the second stage, which is illustratively active when the marking 226 of the rotary switch 224 points to the second marking 232, and a precontrol angle α of preferably between −30° and −90° is assigned to the third stage, having the third marking 234. Preferably, a precontrol angle α of −30° is assigned to the first stage, a precontrol angle α of −60° is assigned to the second stage, and a precontrol angle α of −90° is assigned to the third stage. In departure from this, a continuous, i.e. infinitely variable, adjustment of the precontrol angle α may also be provided, in which case, instead of the three-position rotary switch 224, for example an analog or digital potentiometer, not represented, may be used as control element 222.

Alternatively, the rotary switch 224 of the operator control panel 220 may also have only two, or more than three stages with corresponding markings, which in turn are then each assigned, within the motor electronics 200, an individual precontrol angle α suitable for the respective application of the hand-held power tool 100. In this way, the hand-held power tool 100 can be operated at maximum power in every application by simple and intuitive user intervention, without the risk of thermal overloading of the EC motor 120.

FIG. 2 shows the hand-held power tool 100 of FIG. 1, with the EC motor 120 and an assigned set of motor electronics 200. Here, purely as an example, the EC motor 120 has a permanently excited internal rotor 160, which is connected to the output shaft 130 in a rotationally fixed manner. The internal rotor 160 is surrounded coaxially by an external stator 170, such that here the EC motor 120 is realized as an internal-rotor motor. Alternatively, however, the EC motor 120 may also be designed as an external-rotor motor. The external stator 170 has a motor winding 172, which is preferably formed with three individual windings 174, 176, 178, or phase windings, each respectively arranged with a 120° circumferential offset.

The motor winding 172 with the three individual windings 174, 176, 178 in the external stator 170 is fed by the motor electronics 200 with a three-phase current $I_{rms}$, or with a rotary current, for the purpose of generating a magnetic rotating field by means of the lines 190, or a (power) bus system, in such a manner that the internal rotor 160, with the output shaft 130, as indicated by the direction of rotation arrow 199, rotates either clockwise or counterclockwise at a variable rotational speed n. In this case, the EC motor 120 delivers a mechanical torque M, and thus a mechanical power $P_{mech}$, via the output shaft 130, according to the equation $P_{mech}=n*M$. For the purpose of open-loop and/or closed-loop control of the EC motor 120, the motor electronics 200 is preferably designed to continuously measure in real time a rotor angle φ, which indicates the respective rotational angle position of the internal rotor 160 in relation to the external stator 170, a present rotational speed n of the internal rotor 160, the respective current $I_{rms}$ in the motor winding 172, the moment M at the output shaft 130, and a temperature of the motor winding 172. An ohmic resistance R of the motor winding 172 is approximately constant 4.7Ω. Otherwise, persons skilled in the art in the field of electrical drive technology are sufficiently familiar with the design and function of an electronically commutated motor such as the EC motor 120, such that there is no need for a more detailed explanation at this point.

Additionally provided is a precontrol-angle control unit 300, which is designed to determine the appropriate precontrol angle α in dependence on the at least two, preferably three, mechanical load conditions of the EC motor 120 already described as part of the description of FIG. 1, in a semi-automatic mode or a fully automatic mode. For this purpose, the operator control panel 220 of the hand-held power tool 100 comprises, in addition to the preferably three-stage rotary switch 224 having the line-type marking 226 as an operator control element 222, a display unit 250, which in this case, as an example, is formed with three discrete display elements 252, 254, 256 such as, for example, light-emitting diodes (LEDs), not represented, possibly of differing colors. In this case, the first display element 252 is assigned to the first marking 230, the second display element 254 is assigned to the second marking 232, and the third display element 256 is assigned to the third marking 234 of the operator control panel 220. The display elements 252, 254, 256 may be positioned beneath the markings 230, 232, 234, in which case the markings 230, 232, 234 in this configuration are translucent. For example, the first display element 252 may be realized with a green LED, the second display element 254 with a yellow LED, and the third display element 256 with a red LED. The display unit 250 is designed, as part of the operator control panel 220, to visualize, in the semi-automatic mode, the suitable precontrol angle α determined by the precontrol-angle control unit 300 in dependence on the present mechanical load condition of the EC motor 120 and to be set manually by the user by means of the operator control element 222. For this purpose, the precontrol-angle control unit 300 is designed to evaluate or measure at least the rotational speed n and/or the mechanical torque M of the EC motor 120, and/or the current $I_{rms}$ of the motor winding 172 of the EC motor 120, if these parameters are not already determined and made available by the motor electronics 200.

In the fully automatic mode, setting of the precontrol angle α is effected automatically, i.e. without any active user intervention, by means of the motor electronics 200 controlled accordingly by the precontrol-angle control unit 300. If necessary, in this case the present mechanical load condition (light, medium, heavy) of the EC motor 120 can be visualized for the user in a visually unambiguous manner by means of the display unit 250, such that the user is always informed about the respectively active precontrol angle α.

The operator control panel 220 is preferably equipped with a further operator control element 240 for switching over between the semi-automatic mode and the fully automatic mode. For this purpose, the operator control element 240 may be designed, for example, as a latch-in pushbutton 242, which can be activated, for example, by being pressed down and can be deactivated again by being pressed down again, the respective switching state of the pushbutton 242, and thus the active status of the semi-automatic mode or the fully automatic mode, being able to be indicated to the user by a further, display element, not represented, such as an LED or the like.

Figure 7:
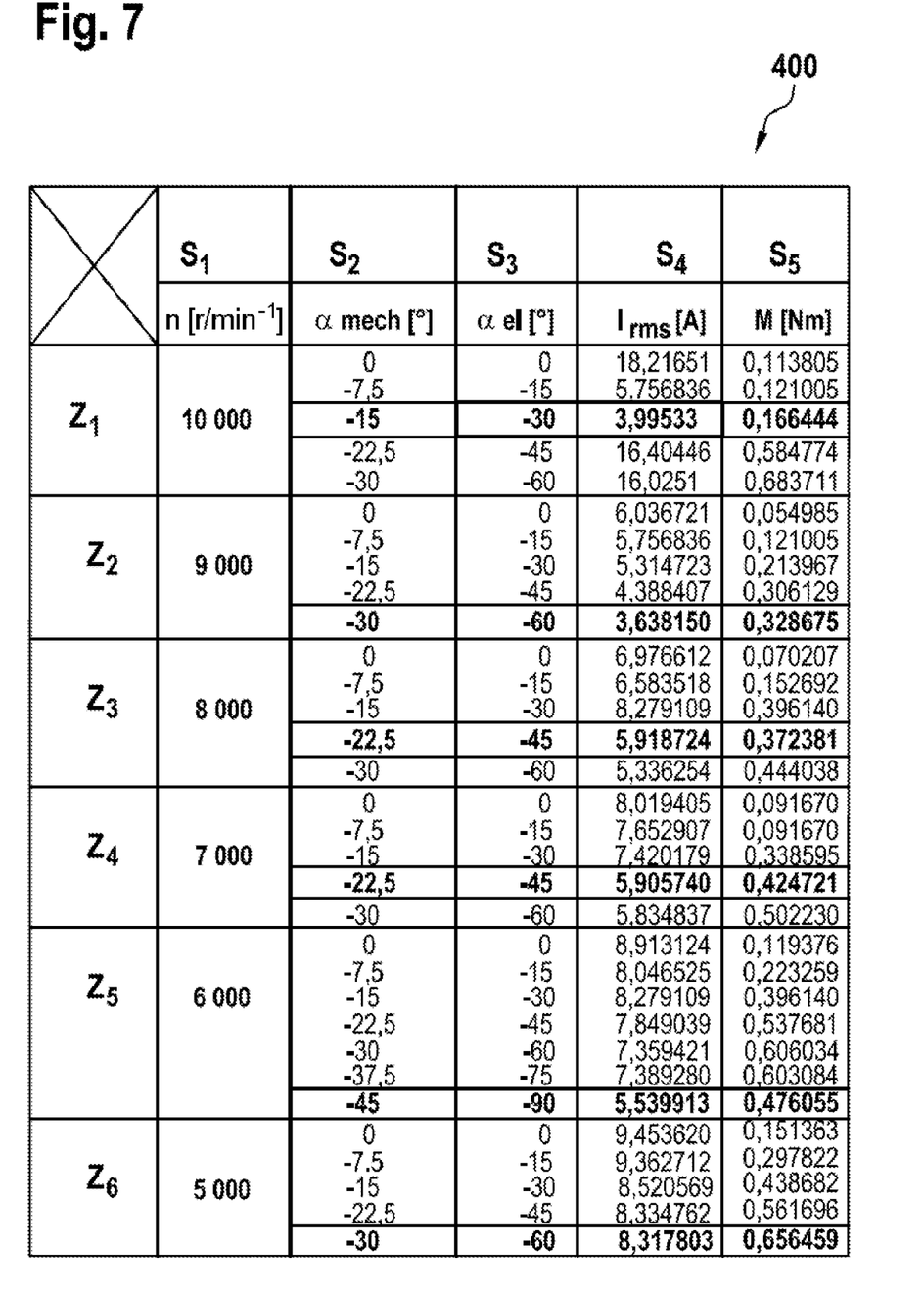

A parameter table 400 for determining the respectively appropriate precontrol angle α is stored in the precontrol-angle control unit 300 or the engine electronics 200 (see in particular FIG. 7). A suitable precontrol angle α to be set in each case can be determined with the aid of the table 400 and at least the measured present rotational speed and/or the present mechanical torque of the EC motor 120 and/or the present current $I_{rms}$ within the motor winding 172 of the EC motor 120. The setting of the precontrol angle α that is suitable in dependence on the specific mechanical load condition of the EC motor 120 is effected, in the fully automatic mode, as indicated by the double case 204, preferably with the aid of the motor electronics 200 controlled accordingly by the precontrol-angle control unit 300, but alternatively may also be effected directly by the precontrol-angle control unit 300.

In the fully automatic mode, the motor electronics 200 identifies the present magnitude of torque of the EC motor 120, and sets a predefined, discrete value of the precontrol angle α, as in the purely manual mode, based on the discrete values within the parameter table. Alternatively, a continuous, or stepless, adjustment of the precontrol angle α is possible, starting from the present light, medium or heavy load condition. All operationally relevant data 312, or measured values, of all mechanical load conditions occurring in practical manual operation of the EC motor 120, in particular in the form of the rotational speed n, the mechanical torque M, at least the current $I_{rms}$ within the motor winding 172, as well as the temperature in the region of the motor winding 172, can be transmitted, by means of the motor electronics 200 and/or the precontrol-angle control unit 300, to an external server 310, or to a so-called "Cloud" for more detailed evaluation and improvement. In this way, a very large number of hand-held power tools 100 in practical use each send the corresponding operationally relevant data, or measured values, to the external server 310, which can contribute, inter alia, to a continuous improvement of the data, or parameters, stored within the parameter table 400 of the precontrol-angle control unit 300 for setting the suitable precontrol angle α, for future generations of hand-held power tools. If necessary, the data, or measured values, improved in this way can also be downloaded in the course of digital updates in hand-held power tools that have already been distributed, and in each case stored in their motor electronics and/or precontrol-angle control unit.

Figure 3:
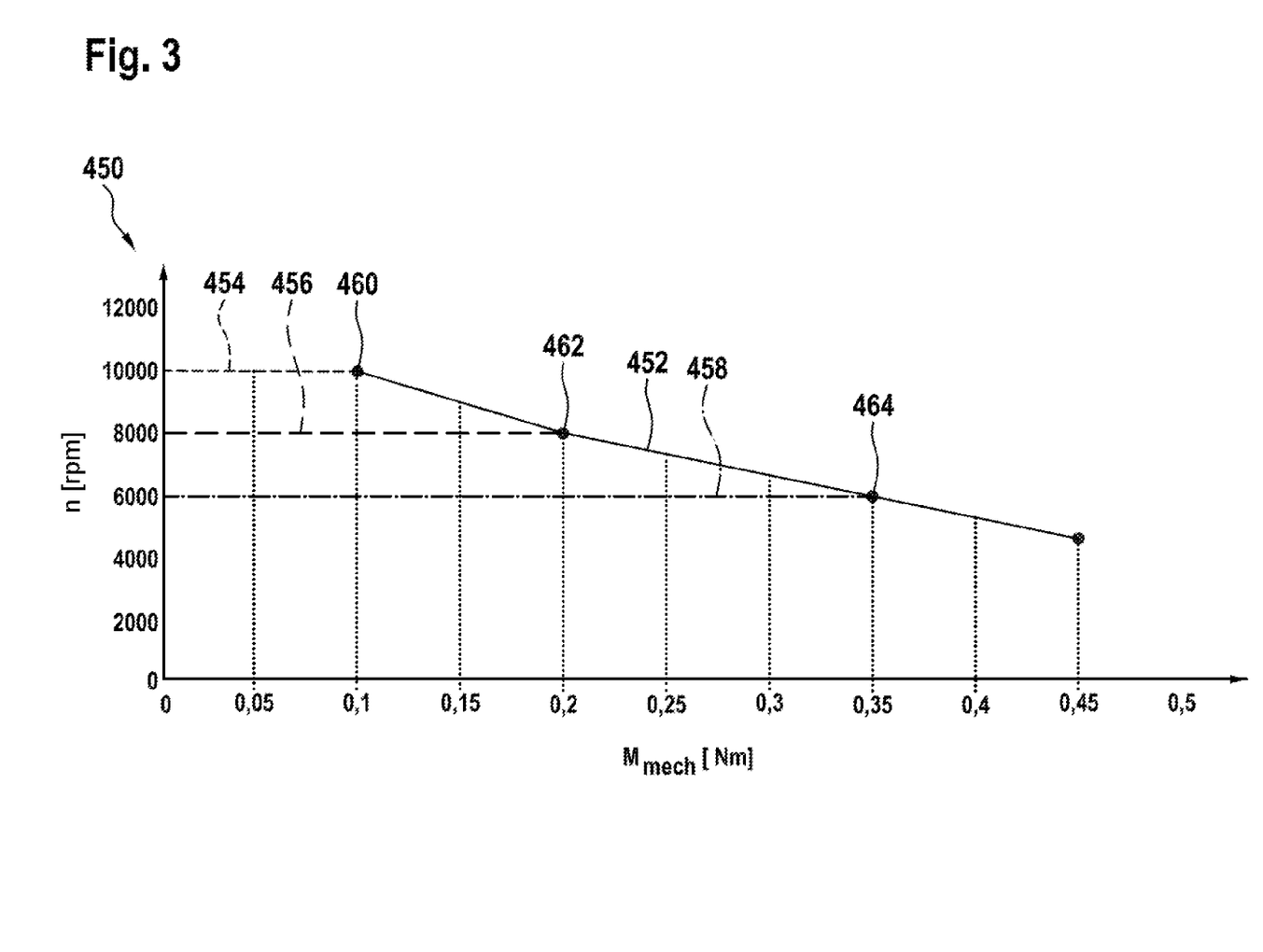

FIG. 3 shows an example of a rotational speed/torque characteristic of the EC motor of FIG. 2. A diagram 450 comprises an ordinate and an abscissa. The mechanical torque M that can be delivered by the EC motor 120 is plotted on the abscissa in steps of 0.05 Nm each, and a rotational speed n of the EC motor is plotted, in steps of 1,000 rpm, or revolutions/minute, on the ordinate. An uncontrolled rotational speed/torque characteristic 452, starting from a torque of 0.1 Nm at 10,000 rpm, runs with a slight curve downwards to a point of a maximum torque of 0.45 Nm at a rotational speed of about 5,000 revolutions/minute. A first, a second and a third straight line 454, 456, 458 correspond to pre-settable characteristic, which can be realized by closed-loop control of the EC motor 120 by means of the motor electronics 200 (see in particular FIG. 2, reference numbers 100, 200). This means that the rotational speed n of the EC motor 120 remains substantially constant up to the respective break points 460, 462, 464, irrespective of the increasing torque M, and only after reaching the respective break point 460, 462, 464 does it drop congruently with the slightly concavely curved rotational speed/torque characteristic 452. The EC motor 120 operates up to the respective break point with an unsuitable precontrol angle α, causing the thermal copper losses in the motor winding to increase sharply.

This process is to be explained briefly in the following, assuming a constant operating point of the EC motor 120, but with differing precontrol angles α. For example, the rotational speed n of the EC motor 120 is 10,000 rpm, and an ohmic resistance R of the motor winding is a constant 4.7Ω. A thermal power loss of the EC motor 120 with the three individual windings is calculated from the following equation:

$$P_{v,Cu} = 3 \cdot (I_{rms}^2 \cdot R) \quad (1)$$

From equation (1), in a first case with a precontrol angle α of −30° there ensues a current $I_{rms}$ of 3.99 A follows, while in a second case with a precontrol angle α of −45°, a current $I_{rms}$ of 16.4 A is obtained.

For the first case, equation (1) then yields $$P_{v,Cu} = 3 \cdot (3.99 \text{ A})^2 \cdot 4.7\Omega = 224.47 \text{ W}.$$

If the current of $I_{rms}$ of 16.4 A in the second case is inserted in equation (1), there is thus obtained:

$$P_{v,Cu} = 3 \cdot (16.4 \text{ A})^2 \cdot 4.7\Omega = 3792.3 \text{ W} \quad (2)$$

This simple calculation example convincingly demonstrates that, with an incorrect precontrol angle α, an extremely high thermal power loss $P_{vCu}$ can occur in the motor winding of the EC motor 120, the thermal power loss in the second case being considerably greater than in the first case. In practice, however, such high thermal losses cannot be achieved, as the EC motor 120 burns out beforehand.

Figure 4:
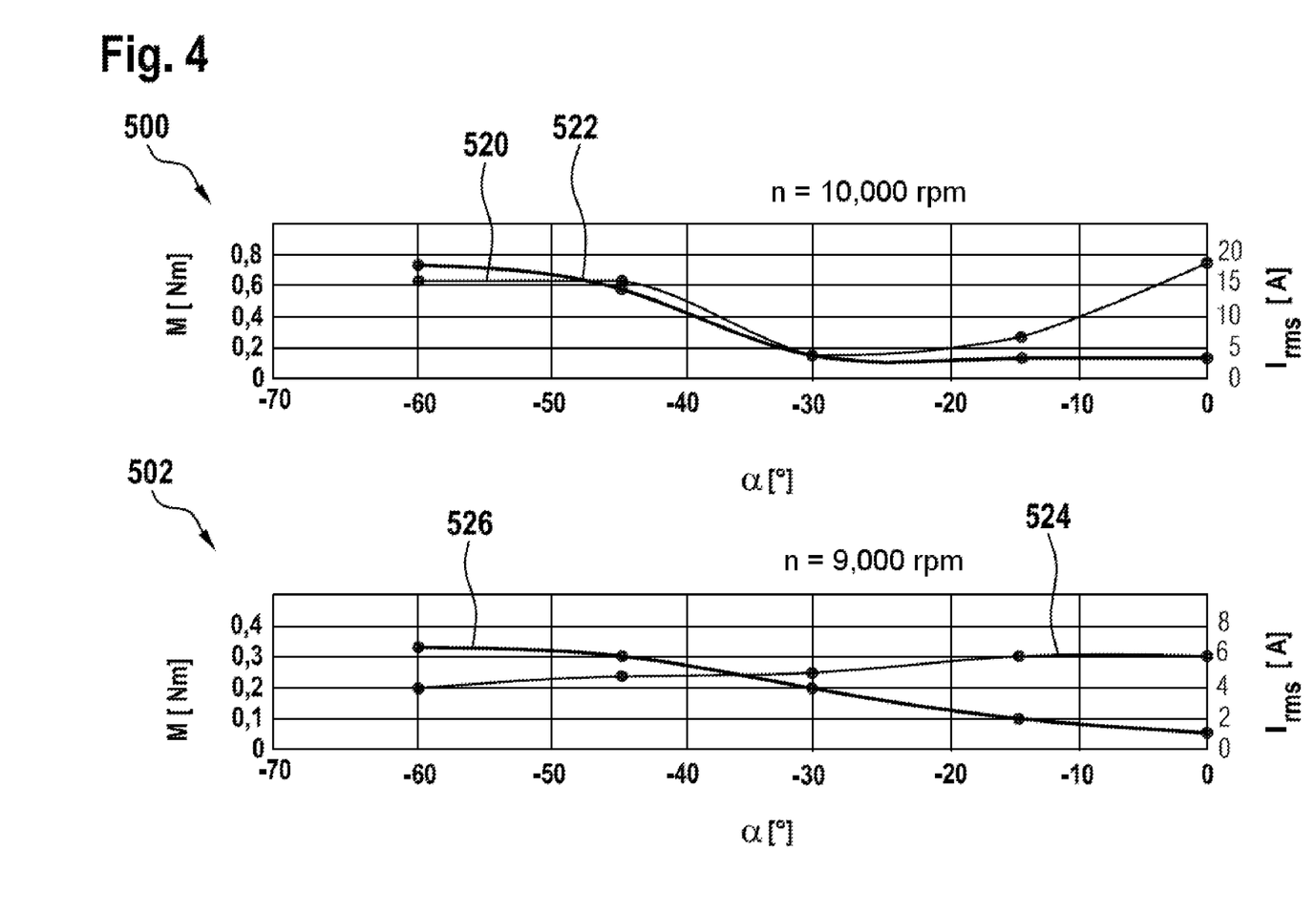
Figure 5:
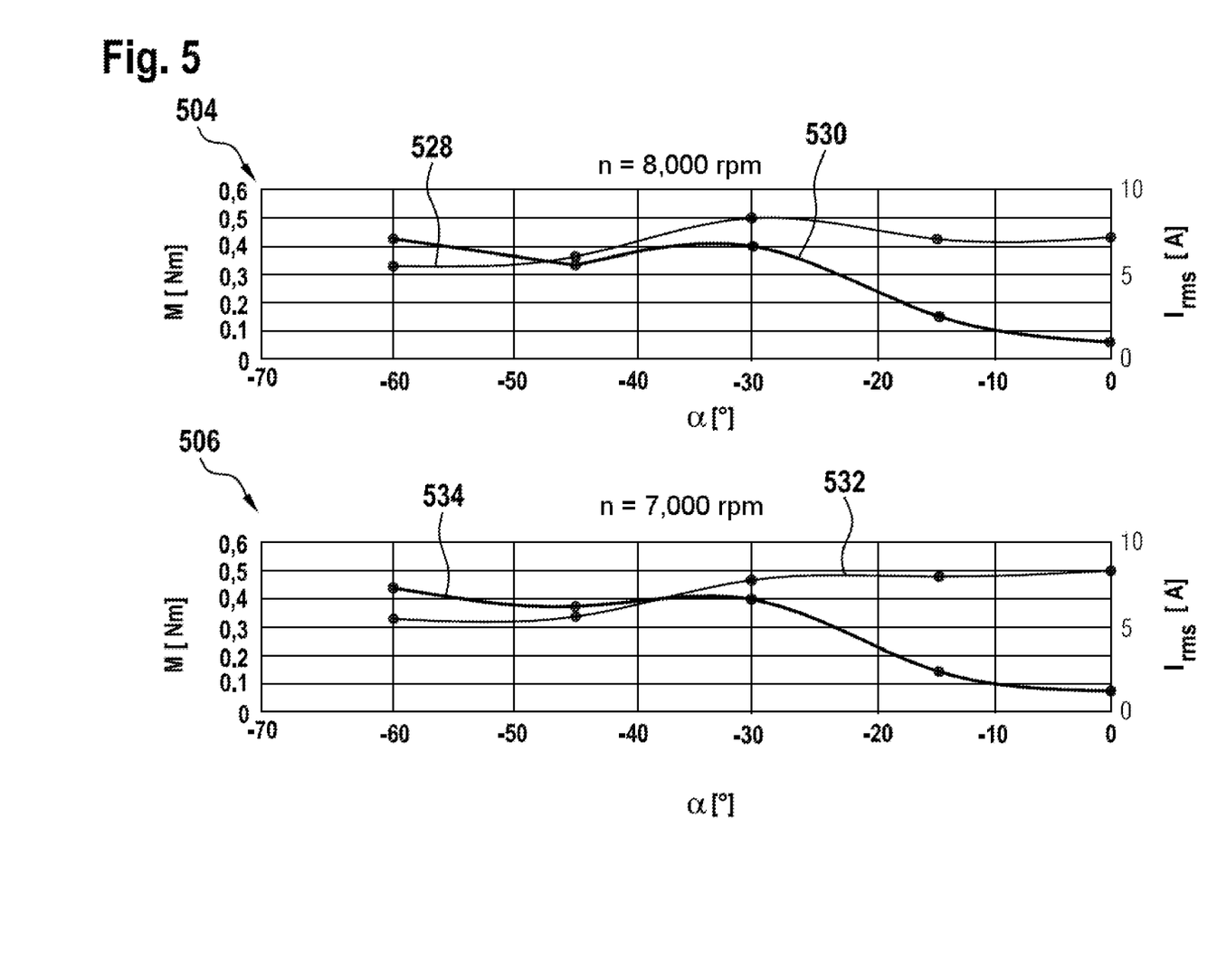
Figure 6:
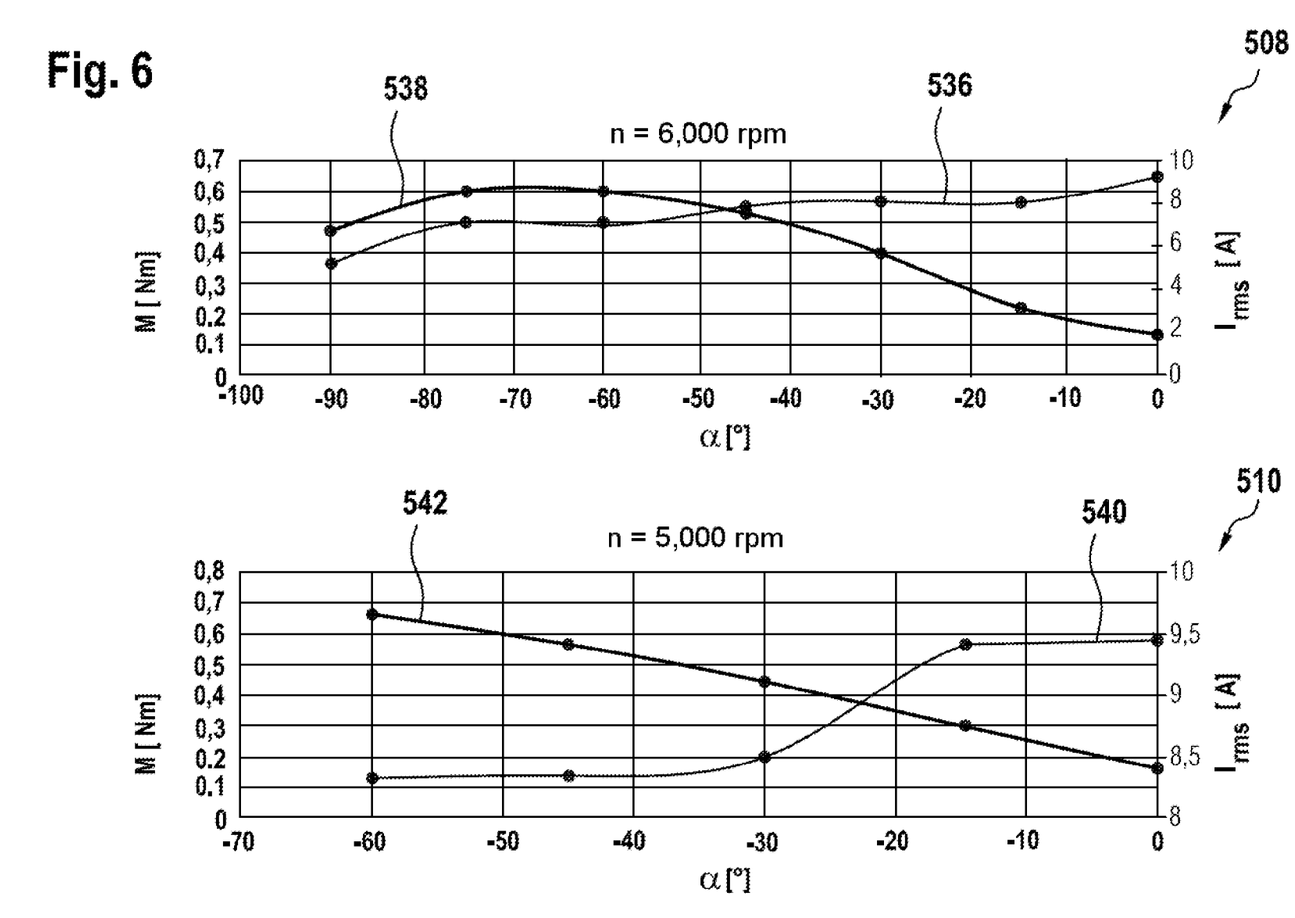

FIG. 4 to FIG. 6—which will be referred to at the same time in the further course of the descriptions—each show two torque/current characteristics of the EC motor 120 of FIG. 2, at differing rotational speeds n as a function of an electrical precontrol angle α.

FIG. 4 to FIG. 6 show six diagrams 500, 502, 504, 506, 508, 510, the diagrams 500 to 510 illustrating the electrical and mechanical conditions for a rotational speed of n=10,000 rpm, n=9,000 rpm, n=8,000 rpm, n=7,000 rpm n=6,000 and n=5,000 rpm as operating points of the EC motor 120. For this purpose, the mechanical torque M of the EC motor 120 is plotted on a first ordinate of each of the six diagrams 500, 502, 504, 506, 508, 510, and the current $I_{rms}$ is plotted on a second ordinate, in each case as a function of a precontrol angle α that increases along the abscissa, which results, in each of the six diagrams 500 to 510, in a current/α characteristic 520, 524, 528, 532, 536, 540, and in a respectively associated torque/α characteristic 522, 526, 530, 534, 538, 542. In this case the characteristics 520, 522 and the characteristics 524, 526 of FIG. 4 constitute a graphical representation of the values in rows $Z_1$ and $Z_2$ of the table of FIG. 7. The characteristics 528, 530 and the characteristics 532, 534 of FIG. 5 represent a graphical conversion of the values in rows $Z_3$, $Z_4$ of the table of FIG. 7. The same applies to the characteristics 536, 538 and 540, 542 of FIG. 6, which represent a graphical conversion of the values in rows $Z_5$, $Z_6$ of the table of FIG. 7.

FIG. 7 shows an example of a parameter table 400 of the EC motor 120 of FIG. 2 with operationally relevant, empirically determined measured values for setting the precontrol angle α. In a column $S_1$ of the parameter table 400, the rotational speed n of the EC motor 120 is listed in rpm, the column $S_2$ contains mechanical precontrol angles α mech of the EC motor 120 in degrees, the column $S_3$ contains the electrical precontrol angles α el of the EC motor 120 in degrees, the column $S_4$ contains the current $I_{rms}$ in A, and the column $S_5$ comprises the corresponding mechanical (output) moment M of the EC motor 120 in N/m. For example, the parameter table 400, from row $Z_1$, at a rotational speed n of 10,000 rpm, indicates in column $S_3$ a suitable electrical precontrol angle α of −30°, since in this case the current $I_{rms}$ is minimal, with $I_{rms}$=3.99533 A, in the region of intersection of the row $Z_1$ and the column $S_4$. Similarly, a suitable precontrol angle α of row $Z_2$, at a rotational speed n of 9,000 rpm, is −60° in column $S_3$, a suitable precontrol angle α of row $Z_3$, at a rotational speed n of 8,000 rpm, is −45° in column $S_3$, a suitable precontrol angle α of row $Z_4$, at a rotational speed n of 7,000 rpm is −45° in column $S_3$, a suitable precontrol angle α of row $Z_5$, at a rotational speed n of 6,000 rpm is −90° in column $S_3$, and a suitable precontrol angle α of row $Z_6$, at a rotational speed n of 5,000 rpm is −60° in column $S_3$.

It is pointed out that the values of the parameter table 400 are merely examples, and should not be seen as a limitation of the present disclosure. Different selection criteria for determination of the suitable precontrol angle α may also be possible in this case, and all measured values, or data, contained in the table can be included as part of the selection criterion.

Accordingly, for each load condition (light, medium, heavy) of the EC motor 120 of the hand-held power tool 100, and depending on the type and condition of the respective hand-held power tool 100, the suitable precontrol angle α for the EC motor 120 can thus be set automatically for the EC motor 120, by means of the precontrol-angle control unit 300 and in this case controlled by the motor electronics 200, in the fully automatic mode, without any further action by the user (see FIG. 2, reference numbers 100, 102, 120, 200, 300). In the semi-automatic mode, the user is accordingly informed by the engine electronics 200 and/or the precontrol-angle control unit 300, by means of optical display elements 250, of the suitable precontrol angle α, which, however, has to be set manually by the user, by means of the operator control element 222. Alternatively or additionally, an acoustic and/or haptic signaling of the suitable precontrol angle α to be set manually may be provided. Only in the fully manual mode does the user set the appropriate precontrol angle α in dependence on the user's individual perception of the specific work situation with the hand-held power tool 100, in particular in dependence on the presence of a light, medium or heavy load condition, manually set the precontrol angle α by means of the operator control element 222, without activating the precontrol-angle control unit 300. The EC motor 120 of the hand-held power tool 100 according to the disclosure can be operated in any load condition with suitable power and high energy utilization without the risk of thermal overheating. Since thermal overheating is avoided, the electrical insulation system of the EC motor 120 ages less, and the service life of the hand-held power tool 100 is increased. In addition, current peaks of the EC motor 120 of the hand-held power tool 100 and overloading of the local power supply system are avoided.

The invention claimed is:

1. A hand-held power tool, comprising:
   an electronically commutated motor including a motor winding;
   motor electronics, the motor electronics configured to electronically commutate the motor winding using a selected one of a plurality of electrical precontrol angles, thereby adapting the motor winding to different mechanical load conditions of the electronically commutated motor; and an operator control panel including:
- a first marking associated with a first of the plurality of electrical precontrol angles;
- a second marking associated with a second of the plurality of electrical precontrol angles; and
- at least one operator control element operably connected to the motor electronics and movable between a first stage associated with the first marking and a second stage associated with the second marking, the at least one operator control element configured such that when the hand-held power tool is in a manual mode and the at least one operator control element is in the first stage the first of the plurality of electrical precontrol angles is selected, and when the hand-held power tool is in the manual mode and the at least one operator control element is in the second stage the second of the plurality of electrical precontrol angles is selected.

2. The hand-held power tool according to claim 1, wherein:
- the first stage is associated with a light load condition of the electronically commutated motor;
- the second stage is associated with a medium load condition of the electronically commutated motor; and
- a third stage is associated with a heavy load condition of the electronically commutated motor.

3. The hand-held power tool according to claim 2, wherein:
- a precontrol angle of −30° is assigned to the first stage:
- a precontrol angle of −60° is assigned to the second state; and
- a precontrol angle of −90° is assigned to the third stage.

4. The hand-held power tool according to claim 1, further comprising:
- a precontrol-angle control unit configured to identify one of the plurality of electrical precontrol angles based upon a determined load condition of the electronically commutated electric motor when the hand-held power tool is in a semi-automatic mode and when the hand-held power tool is in a fully automatic mode, wherein the determined load condition is one of at least two possible load conditions, the at least two possible load conditions selected from a group consisting of a light load condition, a medium load condition, a heavy load condition.

5. The hand-held power tool according to claim 4, the operator control panel further including:
- a display unit configured to visualize the electrical precontrol angle identified by the precontrol-angle control unit thereby informing a user of the electrical precontrol angle to be selected by the user using the at least one operator control element when the hand-held power tool is in the semi-automatic mode.

6. The hand-held power tool according to claim 5, wherein the plurality of electrical precontrol angles comprises a first electrical precontrol angle and a second electrical precontrol angle, the display unit further configured to visualize the precontrol angle identified by the precontrol-angle control unit using one of:
- a first LED display element of the display unit associated with a first of the plurality of electrical precontrol angles; and
- a second LED display element of the display unit having a color different from a color of the first LED display element and associated with a second of the plurality of electrical precontrol angles.

7. The hand-held power tool according to claim 4, wherein the precontrol-angle control unit is further configured to measure one or more of:
- a rotational speed of the electronically commutated motor;
- a torque of the electronically commutated motor; and
- a current of the motor winding of the electronically commutated motor.

8. The hand-held power tool according to claim 7, further comprising:
- a parameter table stored in the precontrol-angle control unit, wherein the precontrol-angle control unit is configured to determine the determined load condition using the measured one or more of the rotational speed of the electronically commutated motor, the torque of the electronically commutated motor, and the current of the motor winding of the electronically commutated motor.

9. The hand-held power tool according to claim 4, wherein the selected one of the plurality of electrical precontrol angles is selected by the precontrol-angle control unit to be the identified one of the plurality of electrical precontrol angles when the power tool is in the fully automatic mode.

10. The hand-held power tool according to claim 9, further comprising:
- a further operator control element configured to be operated by a user to selectively switch the hand-held power tool into the semi-automatic mode and to selectively switch the hand-held power tool into the manual mode.

11. The hand-held power tool according to claim 4, wherein one or more of the motor electronics and the precontrol-angle control unit is configured to transmit one or more of a rotational speed of the electronically commutated motor, a torque of the electronically commutated motor, a current of the motor winding of the electronically commutated motor, and a temperature of the motor winding to an external server for evaluation.

12. A hand-held power tool, comprising:
- an electronically commutated motor including a motor winding;
- motor electronics, the motor electronics configured to electronically commutate the motor winding using a selected one of a plurality of electrical precontrol angles, thereby adapting the motor winding to different mechanical load conditions of the electronically commutated motor;
- a precontrol-angle control unit configured to identify one of the plurality of electrical precontrol angles based upon a determined load condition of the electronically commutated electric motor when the hand-held power tool is in a semi-automatic mode and when the hand-held power tool is in a fully automatic mode, wherein the determined load condition is one of at least two possible load conditions, the at least two possible load conditions selected from a group consisting of a light load condition, a medium load condition, a heavy load condition; and
- an operator control panel, the operator control panel including a display unit configured to visualize the electrical precontrol angle identified by the precontrol-angle control unit thereby informing a user of the electrical precontrol angle to be selected by the user using an operator control element when the hand-held power tool is in the semi-automatic mode.

13. A hand-held power tool, comprising:
an electronically commutated motor including a motor winding;
motor electronics, the motor electronics configured to electronically commutate the motor winding using a selected one of a plurality of electrical precontrol angles, thereby adapting the motor winding to different mechanical load conditions of the electronically commutated motor;
a precontrol-angle control unit configured (i) to identify one of the plurality of electrical precontrol angles based upon a determined load condition of the electronically commutated electric motor when the hand-held power tool is in a semi-automatic mode and when the hand-held power tool is in a fully automatic mode, wherein the determined load condition is one of at least two possible load conditions, the at least two possible load conditions selected from a group consisting of a light load condition, a medium load condition, a heavy load condition, and (ii) to measure one or more of a rotational speed of the electronically commutated motor, a torque of the electronically commutated motor, and a current of the motor winding of the electronically commutated motor; and
a parameter table stored in the precontrol-angle control unit, wherein the precontrol-angle control unit is configured to determine the determined load condition using the measured one or more of the rotational speed of the electronically commutated motor, the torque of the electronically commutated motor, and the current of the motor winding of the electronically commutated motor.

* * * * *